United States Patent
Hui et al.

(10) Patent No.: US 9,505,262 B2
(45) Date of Patent: Nov. 29, 2016

(54) WHEELS AND VEHICLES COMPRISING THE SAME

(71) Applicant: CHINA INTELLECTUAL PROPERTY (H.K.) LIMITED, Hong Kong (CN)

(72) Inventors: Martin Wing-Kin Hui, Hong Kong (CN); Miranda Hoi-Ying Chung, Hong Kong (CN); Emily Fong-Man Hui, Hong Kong (CN)

(73) Assignee: COMPUROBOT TECHNOLOGY COMPANY, Dongguan (CN)

( * ) Notice: Subject to any disclaimer, the term of this patent is extended or adjusted under 35 U.S.C. 154(b) by 0 days.

(21) Appl. No.: 14/720,557

(22) Filed: May 22, 2015

(65) Prior Publication Data
US 2015/0360508 A1    Dec. 17, 2015

(30) Foreign Application Priority Data

Jun. 11, 2014    (CN) .......................... 2014 1 0257919

(51) Int. Cl.
| | | |
|---|---|---|
| *B60B 1/14* | (2006.01) | |
| *B60B 9/08* | (2006.01) | |
| *B60B 1/00* | (2006.01) | |
| *B60B 1/02* | (2006.01) | |

(52) U.S. Cl.
CPC ............... *B60B 1/14* (2013.01); *B60B 1/003* (2013.01); *B60B 1/0207* (2013.01); *B60B 9/08* (2013.01)

(58) Field of Classification Search
CPC ....... B60B 1/003; B60B 1/02; B60B 1/0207; B60B 1/0261; B60B 1/0269; B60B 1/0276; B60B 1/0284; B60B 1/0292; B60B 1/06; B60B 1/14; B60B 9/00; B60B 9/02; B60B 9/06; B60B 9/10; B60B 9/26; B60B 9/08
USPC ................................. 301/54, 55, 56, 66, 104
See application file for complete search history.

(56) References Cited

U.S. PATENT DOCUMENTS

| | | | | |
|---|---|---|---|---|
| 1,142,606 | A * | 6/1915 | Murray ..................... | B60B 9/26 152/69 |
| 1,210,998 | A * | 1/1917 | Smolen ..................... | B60B 9/06 152/105 |
| 4,093,299 | A * | 6/1978 | Capps ................. | B60B 17/0031 152/85 |
| 4,240,483 | A * | 12/1980 | Gregoric .................. | B60B 9/26 152/380 |
| 8,962,120 | B2 * | 2/2015 | Delfino ..................... | B60B 9/02 152/43 |
| 2004/0069385 | A1 * | 4/2004 | Timoney .................. | B60C 7/18 152/69 |

* cited by examiner

*Primary Examiner* — John Walters
(74) *Attorney, Agent, or Firm* — Weiss & Moy, P.C.; Jeffrey D. Moy

(57) ABSTRACT

The present invention is applicable to the technical field of wheels. Provided are a wheel (100) and a vehicle comprising the same. The wheel (100) comprises a wheel hub (10) and a wheel housing (20, said wheel hub (10) being mounted on a wheel axle, and a tire being mounted outside said wheel housing (20). Said wheel (100) further comprises a plurality of spring strips (40), each of said spring strips (40) comprising a loop (41), each of said loops (41) comprising a top end and a bottom end; the top end of said loop (41) is connected to the outer wall of said wheel hub (10), and the bottom end of said loop (41) is connected to the inner wall (21) of said wheel housing (20); each of said spring strips (40) comprises at least two free ends (42) that are cross-linked with each other, a first slot (411) is provided on one of said at least two free ends (42), and a portion of the other free end is set as a narrow strip which is inserted into said first slot (411). Thus, the present invention enables running wheels to have a good shock-absorbing effect, thereby making it convenient for an operator to control the speed and direction.

12 Claims, 5 Drawing Sheets

WHEELS AND VEHICLES COMPRISING THE SAME

TECHNICAL FIELD

The present invention relates to the technical field of wheels, and particularly to wheels having shock absorption features.

BACKGROUND ART

The typical wheel of a bicycle comprises a wheel hub connected to a wheel housing. The wheel housing is a ring having an inner wall and an outer wall, and is positioned over the wheel hub. A rubber tire is mounted onto the outer wall of the wheel housing. The wheel hub is positioned at the center of the wheel housing and onto an axle about which the wheel turns. The inner wall of the wheel housing is connected to the wheel hub by spokes. The spokes are rods usually made of stainless steel or other strong material. Typically, a bicycle frame has a front fork, which is for securing a wheel to. The bicycle frame also has a frame rear for securing another wheel to. A typical wheel does not have much shock-absorbing function except for a small amount of cushioning provided by the tire. When the bicycle is being peddled over an uneven stony ground, the bicycle will be subjected to intense bumping which may damage the bicycle frame and may cause much discomfort to the rider. To overcome the damage and discomfort caused by the bumping, a shock absorber is usually mounted on the front fork of the bicycle frame and another shock absorber mounted on the frame rear.

Korean Patent No. KR10-2012-0085689, entitled "자전거 바퀴" (WHEEL FOR BICYCLE), discloses an improved wheel in which a spring is mounted in the end of each spoke to provide further shock proofing function. When this wheel runs over a stone, the impact causes the spring on the spokes nearest to the ground to be compressed while the springs in the opposite side of the wheel are extended. The shock absorption efficiency of this wheel is affected by the force required to deform the springs on the spokes. However, the improvement in shock absorption provided by the springs on the spokes is relatively small.

FIG. 1A and FIG. 1B illustrates the wheel of German Patent Application No. DE202005011566, entitled "Federsystem für Fahrräder" (SPRING SYSTEM FOR BICYCLE), which discloses another improved wheel in which spring strips are used in place of wheel spokes. The wheel comprises a wheel hub 3 is connected to a midwheel housing. The midwheel housing is in turn connected to a wheel housing 4 via spring strips. The spring strips are typically made of a strong elastic material capable of being deformed resiliently. Each spring strip is in the shape of a spiral, spiraling outwardly in the same direction as the turning of the wheel 4 when the bicycle is cycled forward. A centripetal compression is applied onto the lower spring strips 1 as the wheel rolls on the ground 6. In particular, when the wheel rolls quickly onto an obstacle or protrusion on the ground, the spring strips deforms on being compressed by the protrusion but bounces back to its original shape when the compression force has dissipated. In this way, the spring strips provides shock proofing on a bumpy ground and also provides an energy-storage function. However, as the spring strip is a spiral, the force vector when the spring strip re-bounces to its original shape causes the wheel hub 3 to move towards the center of the wheel 4, and also towards the direction in which the vehicle is moving. This causes the running speed of the vehicle to be increased momentarily and the vehicle will jerk forward. Furthermore, when the lower spring strips 2 are compressed the upper spring strips at the top part of the wheel hub are correspondingly extended. These upper spring strips will also re-bounce back to their original shape when the when the compression force caused by the protrusion has dissipated. Again, as the spring strip is spiral, the force vector of this re-bounce causes the wheel hub 3 to move towards the center of the wheel 4, and also towards the direction in which the vehicle is advancing. The running speed of the vehicle will also be increased momentarily, further jerking the bicycle forward. In other words, the wheel disclosed in DE202005011566 has not only a shockproof function but also stores energy. When the vehicle rides onto an obstacle 5 in front of the vehicle causing deformation of the spring strips, energy is stored in the deformed spring strips which jerks the vehicle forward when released. This erratic change in speed makes it difficult for a driver to control the vehicle.

Accordingly, it is desirable to provide a wheel which has good shock-absorbing effect and which allows a rider or driver to have better control over the speed and direction of the vehicle in which the wheel is installed.

STATEMENT OF INVENTION

In a first aspect, the invention proposes a wheel (100) comprising: a wheel hub (10); a wheel housing (20); characterized in that: a plurality of loops (41) connect the wheel housing (20) to the wheel hub (10).

The loop (41) of each spring strip is symmetrical about its apex. When the apex is connected to the wheel hub (10), and the line of symmetry of the loop (41) is aligned to the normal of the surface of the wheel hub (10), support provided by the loop (41) will be even on both sides about the point of contact on the wheel hub (10). The normal is perpendicular to the tangent of the point of contact on the wheel hub (10). This prevents an uneven support at the point of contact on the wheel hub (10), reducing jerkiness in the wheel (100) when the spring strip deforms and rebounds.

Preferably, each loop (41) is a ring. More preferably, each loop (41) is a spring strip (40) is folded into a loop (41) having two ends (42); the loop (41) being connected to the wheel hub (10), and the two ends (42) connected to the inner wall (21) of said wheel housing (20).

Preferably, said two free ends (42) are separately inserted into the inner wall (21) of said wheel housing (20).

Preferably, a first slot (411) is provided proximate one end of the spring strip; a neck of narrower width is provided proximate the other end of the spring strip; the end of the spring strip having the neck is inserted through the first slot (411); such that the first slot (411) is positioned over the neck to form the loop (41).

Preferably, the first slot (411) is move-able along the neck for adjusting the size of the loop (41). Alternatively, the first slot (411) is affixed to the neck.

Preferably, a second slot (413) is provided on one of the two ends (42) of each loop (41), a corresponding location hole is provided on the inner wall (21) of said wheel housing (20), a set screw passes through said second slot (413) and said location hole connecting end to the inner wall (21) of the wheel housing (20).

Preferably, the shape of said loop (41) and/or the position of said wheel hub (10) relative to the axle of the wheel (100) is adjustable by varying the position of said second slot (413) relative to the set screw.

Preferably, the number of loops (41) is three or more. More preferably, said plurality of loops (41) are evenly arranged around the wheel hub (10).

Typically, each loop (41) is made of a single material.

In a second aspect, the invention proposes a vehicle comprising a wheel (100) as described. Typically, the rated maximum speed of said vehicle is 50 km/h, or the rated maximum load capacity of each wheel (100) of said vehicle is 500 kg. For example, said vehicle is a bicycle or a scooter.

In a further aspect, the invention propose a wheel (100) comprising a wheel hub (10) and a wheel housing (20), said wheel hub (10) being mounted on a wheel (100) axle, and a tire being mounted outside said wheel housing (20), wherein said wheel (100) further comprises: a plurality of spring strips, each of said spring strips comprising a loop (41), each of said loops (41) comprising a top end and a bottom end, wherein the top end of said loop (41) is connected to the outer wall of said wheel hub (10), and the bottom end of said loop (41) is connected to the inner wall (21) of said wheel housing (20), and wherein each of said spring strips comprises at least two free ends that are cross-linked with each other, a first slot (411) is provided on one of said at least two free ends, and a portion of the other free end is set as a narrow strip which is inserted into said first slot (411).

Preferably, said plurality of spring strips are uniformly disposed in said wheel housing (20).

Preferably, the spring strip is a loop (41) having two extending free ends (42).

Preferably, the spring strip is made of a single material.

Preferably, said at least two free ends that are cross-linked with each other are mutually displaceable, or said at least two free ends that are cross-linked with each other are mutually fixed.

Preferably, said at least two free ends are separately inserted into the inner wall (21) of said wheel housing (20).

Preferably, a second slot (413) is provided on said free end, a location hole is provided on the inner wall (21) of said wheel housing (20), and a set screw passes through said second slot (413) and said location hole sequentially to connect said free end with the inner wall (21) of said wheel housing (20).

Preferably, when the portions of said two free ends that are inserted into the inner wall (21) of said wheel housing (20) overlap each other, said spring strip forms an 0-shape.

Preferably, the shape of said loop (41) and/or the position of said wheel hub (10) relative to said wheel (100) axle by adjusting the position of said second slot (413) that is fixed with said set screw.

Preferably, when said wheel (100) is not compressed, said wheel hub (10) is located at the centre of said wheel (100).

Preferably, the number of said spring strips is three or more.

The wheel (100) provided by the present invention is configured to comprise a wheel hub (10), a wheel housing (20), and spring strips, wherein the wheel hub (10) is connected to the wheel housing (20) via a plurality of spring strips, each including a loop (41). Since the loop (41) of the spring strip is symmetrical, it can reduce the vibration sense when the wheels (100) are rolling and, on the other hand, can also eliminate the tangential force produced by the energy storage of the spring strips when a wheel (100), of which the wheel hub (10) and the wheel housing (20) are connected via the spring strips, is running in the prior art, thereby improving the controllability of a vehicle mounted with the wheels (100) provided by the present invention. Moreover, each of said spring strips comprises at least two free ends that are cross-linked with each other, a first slot (411) is provided on one of said at least two free ends, a portion of the other free end is set as a narrow strip which is inserted into said first slot (411), and the specific connection positions of the two free ends and the wheel housing (20) can be adjusted, thereby making it convenient to adjust the structure of the loop (41) while improving users' autonomy in configuring wheel (100) structures to meet their different needs for the use of wheels (100).

BRIEF DESCRIPTION OF THE DRAWINGS it will be convenient to further describe the present invention with respect to the accompanying drawings that illustrate possible arrangements of the invention, in which like integers refer to like parts. Other embodiments of the invention are possible, and consequently the particularity of the accompanying drawings is not to be understood as superseding the generality of the preceding description of the invention.

DESCRIPTION OF EMBODIMENTS

Figures 1A, 1B:
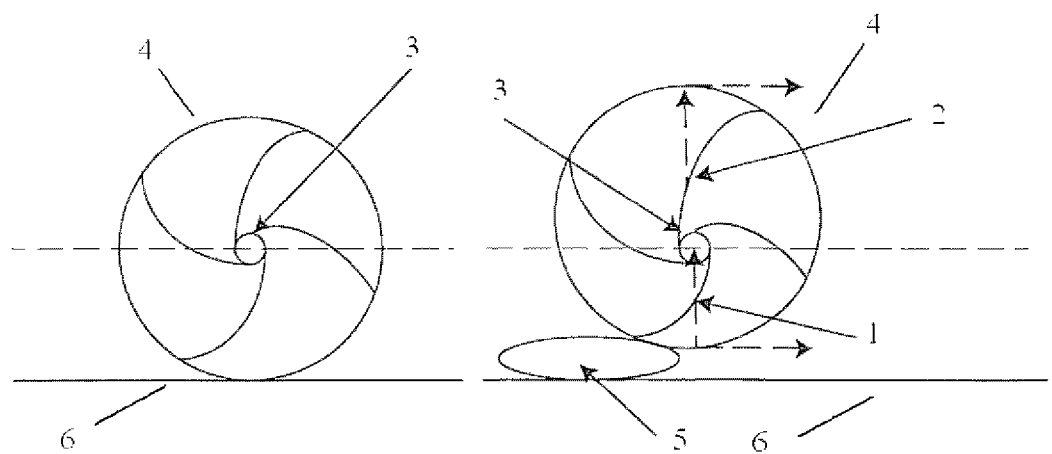
FIG. 1A is a schematic view illustrating the structure of a wheel provided in the prior art.
FIG. 1B is a schematic view illustrating the structure of a wheel provided in the prior art.
Figure 2:
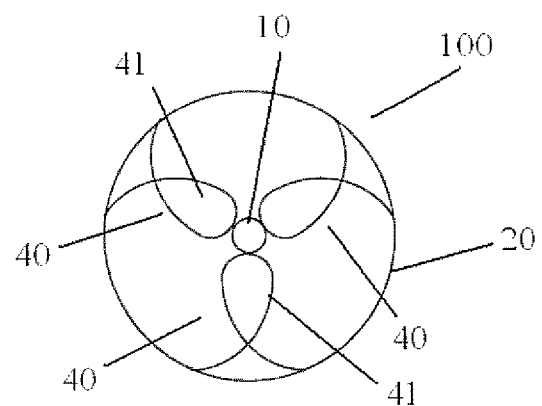
FIG. 2 is a schematic view illustrating the structure of a wheel of an embodiment of the invention.

FIG. 2, FIG. 3B to FIG. 3C, and FIG. 7 show a first embodiment which is a wheel (100). The wheel (100) comprises a wheel hub (10) and a wheel housing (20). The wheel hub (10) is mounted on a wheel axle to be able to rotate. Typically, a rubber tire is mounted on the outer surface of the wheel housing (20). The wheel housing (20) is connected to the wheel hub (10) by a plurality of spring strips (40).

Each spring strip (40) is preferably made of a single material, such as a metal, a metal alloy, a suitable polymer and so on, and does not need to be welded. The material is preferably strong and resilient, allowing the spring strip (40) to deform and then to re-bounce back into its original shape.

Figure 3A:
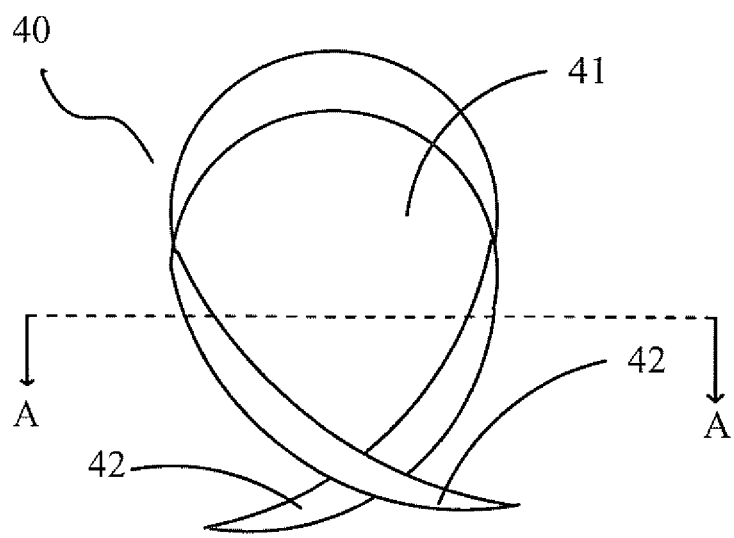
FIG. 3A is a schematic view illustrating the structure of a spring strip mounted on an embodiment the invention.

FIG. 3A shows how an elongate piece of spring strip (40) is folded over itself to form a loop (41) having two extending free ends (42). The two free ends (42) are placed one over the other where they crosses. The specific points where the two free ends (42) cross can be adjusted to determine the size of the loop (41) and, therefore, the strength and extent of deformability of each loop (41).

Figure 3B:
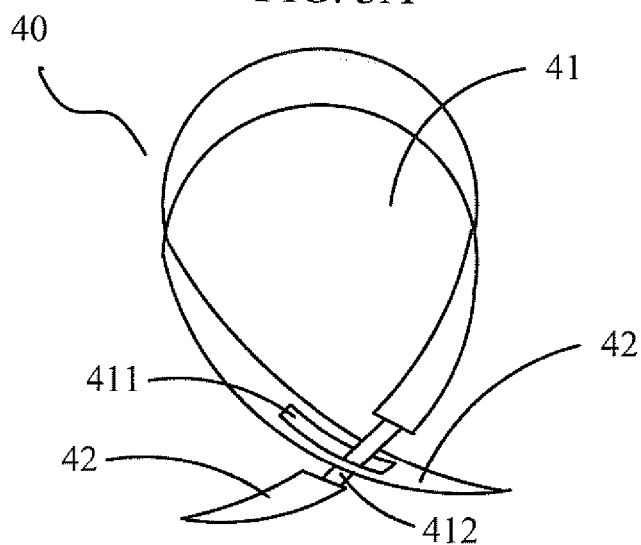
FIG. 3B is a schematic view illustrating the structure of a spring strip mounted on an embodiment the invention.

More preferably, however, the two free ends (42) are not merely crossed over each other but are mechanically linked where they cross. FIG. 3B shows a first slot (411) provided proximate to one of the free ends (42). A neck (412), which is a narrower part on the spring strip (40), is provided proximate the other free end (42). The free end (42) with the neck (412) is inserted through the first slot (411) to provide the loop (41). The width of the neck (412) is pre-determined to fit into the width of the first slot (411), so that the neck (412) and the first slot (411) can slide over each other to adjust the size and shape of the loop (41). Preferably, the first slot (411) is longer than the length of the neck (412). In a variation of the embodiment, the two free ends (42) can be fixed to each other where they cross instead of allowing their point of crossing to be adjustable.

The apex of the loop (41) is connected to the outer wall of the wheel hub (10). The free ends (42) constitute the 'bottom' end of the loop (41), as opposed to the apex as the 'top' end. The bottom end of the loop (41) is connected to the inner wall (21) of the wheel housing (20). That is, the two free ends (42) are separately inserted into the inner wall (21) of said wheel housing (20). The positions of the two free ends (42) in the inner wall (21) of the wheel housing (20) are preferably adjustable, also allowing adjustment of the size and shape of the loop (41).

Figure 3C:
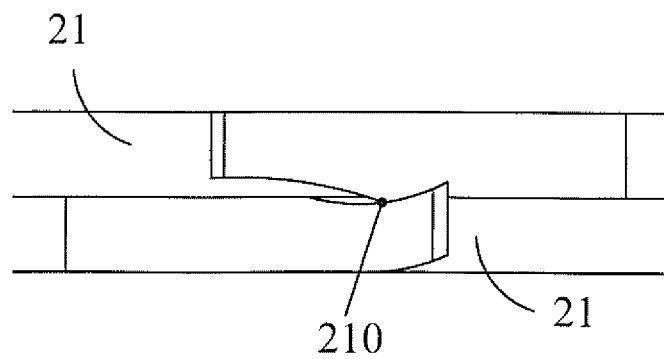
FIG. 3C is a cross-sectional schematic view of FIG. 3A in the A-A direction.

FIG. 3C is a cross-sectional schematic view of FIG. 3A in the A-A direction, showing the two free ends (42) crossing past each other on the inner wall (21) of the wheel housing (20). The point where the two free ends (42) extend past each other is labelled as 210.

The wheel hub (10) and the wheel housing (20) are connected via a plurality of such spring strips (40). As each loop (41) is a symmetrical structure about a line of symmetry extending from the apex to the part where the two free ends (42) cross over each other, the point on the wheel hub (10) supported by the apex is evenly supported on both sides of the line of symmetry. That is, when the apex is connected to the wheel hub (10), the line of symmetry of the loop is aligned to the normal of the surface of the wheel hub (10). As the skilled man knows, a normal is an imaginary line perpendicular to the tangent at the point of contact on a curved surface. Support provided by the loop (41) is therefore even on both sides about the point of contact on the wheel hub (10). This solves the problem of uneven support at that point of contact on the wheel hub (10), reducing jerkiness or sudden speed increase in the wheel (100) when the spring strip deforms and rebounds. In other words, the tangential force which can offset any tangential is only the centripetal or centrifugal force. In prior arts as disclosed in FIG. 1A and FIG. 1B, the springs are asymmetric and the compress and release of the spring may generate different force vector along the tangent line. Such force may have a pull for or push against the rotational movement of the wheel. The loop creates force vectors that more or less neutralized each other along the tangential line of the wheel.

Therefore, when a vehicle such as a bicycle which is mounted with the wheel (100) is running on an uneven stony ground, the damage to the bicycle frame is lessen by the even shock absorption provided by the symmetrically aligned spring strips in the wheel. This also improves the comfort of the passenger or rider and the vehicle is easier to control.

The number of spring strips (40) in the wheel is three or more. The plurality of spring strips (40) is evenly arranged about the wheel housing (20) so that the wheel (100) experienced uniform shock absorption as it rolls over the ground.

Figure 5A:
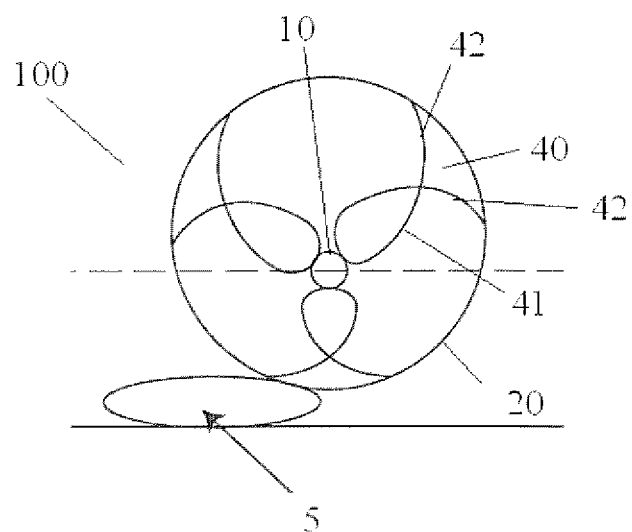
FIG. 5A is a schematic view illustrating the structure of a wheel of an embodiment the invention.

FIG. 5A is a schematic drawing of a wheel housing (20) having a diameter of about 406 mm (according to the ISO 406 mm standard). The wheel (100) is a 20-inch wheel for a bicycle. The wheel hub (10) and the wheel housing (20) are connected by three spring strips (40). The apex of each a loop (41) is connected to outer wall of the wheel hub (10). The two free ends (42) are mounted onto the inner wall (21) of the wheel housing (20). The elasticity of the spring strips (40) allows the wheel hub (10) to have freedom of movement about the centre of the wheel housing (20); the wheel hub (10) can be displaced to become eccentric in the wheel when the wheel is bumped over an obstacle. The dashed line in FIG. 5A shows the wheel axle slightly displaced downwardly from the centre of the wheel. The two upper loops are slightly extended while the lower loop is relatively compressed. The extent to which the centre of the wheel can be displaced eccentrically is determined by the compressibility and resilience of the spring strips (40). This depends on the material of the spring strip and also the size and shape of the loop, and the length of the extending free ends (42). When the wheel (100) is not subject to a compression force, the wheel hub (10) is located at the centre of said wheel (100).

Figure 5B:
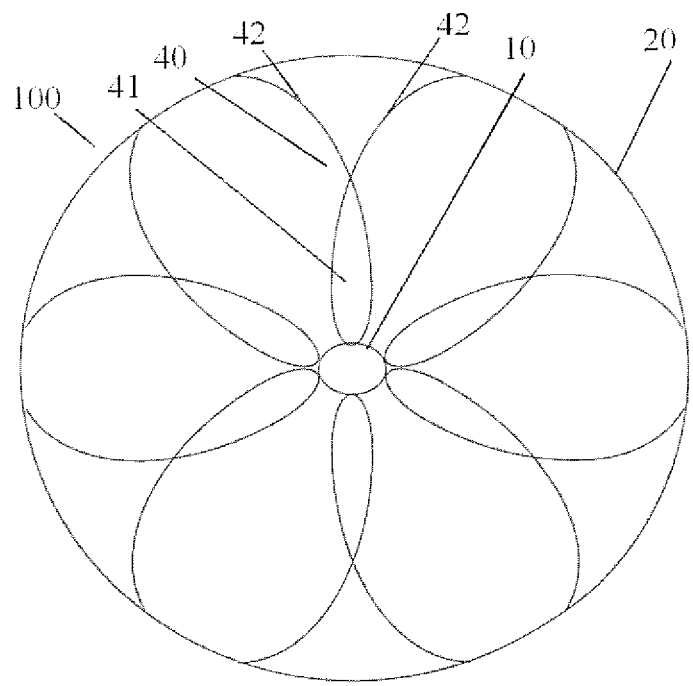
FIG. 5B is a schematic view illustrating the structure of a wheel of an embodiment the invention.

FIG. 5B shows a variation of the embodiment wherein the wheel housing (20) has a diameter of about 559 mm (according to ISO 559 mm standard), the wheel (100) is commonly called a wheel for a 26-inch bicycle. The wheel hub (10) and the wheel housing (20) are connected by six spring strips (40). In this embodiment, the size of the loop is smaller than those in FIG. 5, by adjusting the point where the two free ends (42) crosses each other, and also by adjusting the point where each free end (42) is attached to the inner wall of the wheel housing (20).

Figure 6:
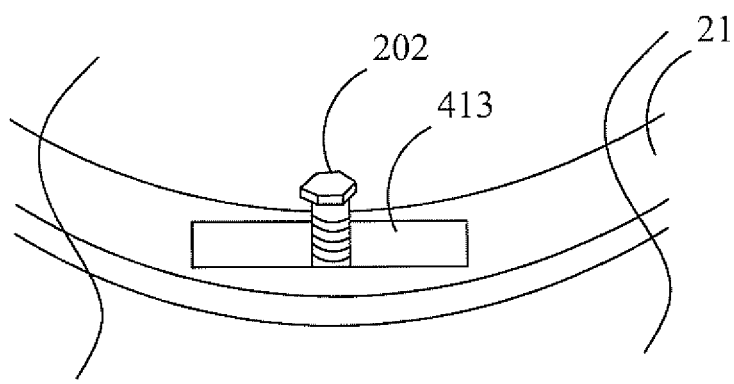
FIG. 6 is a schematic view illustrating that spring strips are fixed to a wheel housing in the wheel of an embodiment the invention.

FIG. 6 shows a further feature in the embodiments, which is a second slot (413) provided on each free end (42). The second slot (413) is meant for a screw (202) to connect the free end (42) to the inner wall (21) of the wheel housing (20). A corresponding location hole (not shown) is provided on the inner wall (21) of the wheel housing (20) for each second slot (413). A set screw 202 is used to screw the free end (42) to the location hole, by passing through the second slot (413). The second slot (413) has a length which can slide past the screw (202) if the screw (202) has not been screwed into the wheel housing (20) tightly, which allows selection of the specific position on each free end (42) to connect to the location hole.

Therefore, the shape of the loop (41) as well as the position of the wheel hub (10) relative to the wheel axle can be adjusted by the position of the second slot (413) to the location hole 201. If the two free ends (42) are move closer to each other, the loop (41) will be enlarged, increasing the stiffness of the loop (41), thereby weakening the ability to absorb shock and narrowing the moving range of the wheel hub (10) relative to the wheel axle. Conversely, if the two free ends (42) move further apart, the size of the loop (41) will be reduce and the stiffness of the a loop (41) will be reduced, thereby enhancing the ability to absorb shock and increasing the moving range of the wheel hub (10) relative to wheel axle.

Therefore, a vehicle operator can enhance or reduce the elasticity of each a loop (41) according to the conditions of the road surface, thereby increasing or reducing the moving range of the wheel hub (10) to the wheel axle.

Figure 4:
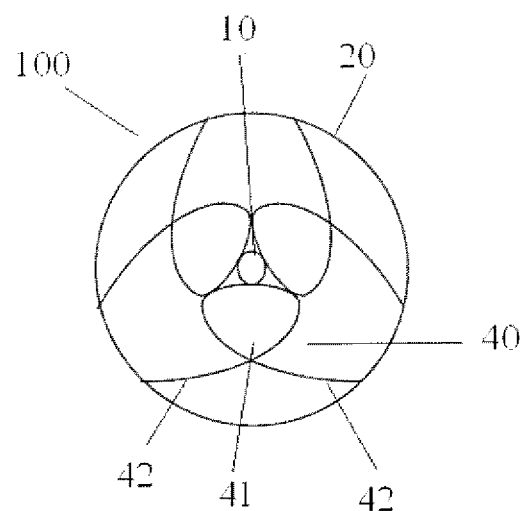
FIG. 4 is a schematic view illustrating the structure of a wheel provided in a preferred embodiment of the invention.
Figure 7:
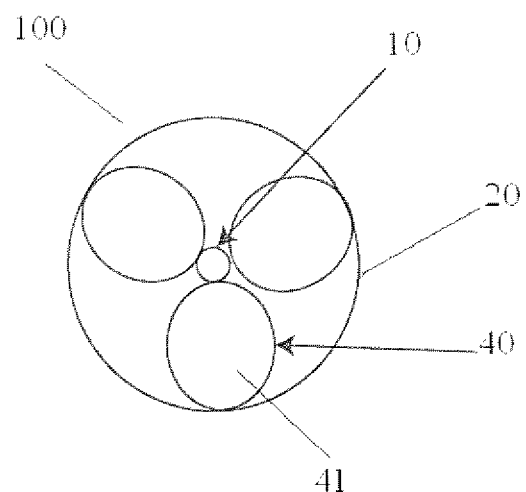
FIG. 7 is a schematic view illustrating the structure of the wheel provided in FIG. 1.

FIG. 4 shows a variation of the embodiment in which the two free ends (42) are mounted further apart from each other on the inner wall (21), providing a smaller loop (41). FIG. 7 shows a further variation of the embodiment, wherein the two free ends (42) are connected at one point with little or no overlapping to provide an 0-shaped spring strip (40).

In use, the wheel (100) may be mounted onto a vehicle. The rated maximum speed of the vehicle may be 50 km/h. The rated maximum load capacity of each wheel (100) of said vehicle may be 500 kg. Preferably, said vehicle is a bicycle or a scooter, or other low speed, low load vehicle, such as a bike (bicycle) or electric bicycle as means of transport or exercise, a tricycle or quadricycle, or a vehicle which runs at a speed of less than 50 kilometers per hour or of which each wheel bears the load of less than 500 kg.

In summary, since the loop (41) of the spring strip (40) is symmetrical, it can reduce shock and vibration imposed on the vehicle when the wheels (100) are rolling over a bumpy ground and, on the other hand, can also eliminate the tangential force produced by the energy storage of the spring strips when a wheel of the prior art is running over a bumpy ground, thereby improving the controllability of a vehicle. In other words, in prior arts as disclosed in FIG. 1A and FIG. 1B, the springs are asymmetric and the compress and release of the spring may generate different force vector along the tangent line. Such force may have a pull for or push against the rotational movement of the wheel. The present invention with the construct of a loop create force vectors that are more or less neutralize each other along the tangential line of the wheel.

Moreover, each of said spring strips comprises at least two free ends that are cross-linked with each other, a first slot is provided on one of said at least two free ends, a portion of the other free end is set as a narrow strip which is inserted into said first slot, and the specific connection positions of the two free ends and the wheel housing can be adjusted, thereby making it convenient to adjust the structure of the loop while improving users' autonomy in configuring wheel structures to meet their different needs for the use of wheels.

Other embodiments though not described are envisaged to be within the scope of the invention as claimed. Those skilled in the art can make all kinds of corresponding changes and modifications according to the present invention without departing from the spirit and essence of the present invention. It is intended that all these changes and modifications be covered by the appended claims of the present invention.

The invention claimed is:

1. A wheel (100) comprising:
    a wheel hub (10);
    a wheel housing (20); characterized in that:
    a plurality of loops connect the wheel housing to the wheel hub, wherein each loop is a spring strip (40) folded over forming a loop (41) of the plurality of loops and having two ends (42) extending there from;
    the loop (41) being connected to the wheel hub (10), and the two ends connected to an inner wall (21) of said wheel housing (20), wherein said two ends (42) are separately inserted into the inner wall (21) of said wheel housing (20).

2. A wheel (100) as claimed in claim 1, characterized in that:
    a first slot (411) is provided proximate one end of the spring strip;
    a neck of narrower width is provided proximate an other end of the spring strip;
    the other end of the spring strip having the neck inserted through the first slot (411);
    such that the first slot (411) is positioned over the neck to form the loop (41).

3. A wheel (100) as claimed in claim 2, characterized in that:
    the first slot (411) is move-able along the neck for adjusting the size of the loop.

4. A wheel (100) as claimed in claim 2, characterized in that:
    the first slot (411) is affixed to the neck.

5. A wheel (100) as claimed in claim 1, wherein
    second slot (413) is provided on one of the two ends of each loop,
    a corresponding location hole is provided on the inner wall (21) of said wheel housing (20),
    a set screw passes through said second slot (413) and said location hole connecting end to the inner wall (21) of the wheel housing (20).

6. A wheel (100) as claimed in claim 5, wherein
    the shape of said loop (41) and/or the position of said wheel hub (10) relative to the axle of the wheel is adjustable by varying the position of said second slot (413) relative to the set screw.

7. A wheel (100) as claimed in claim 1, characterized in that:
    the number of loops is three or more.

8. A wheel (100) as claimed in claim 1, characterized in that:
    said plurality of loops are evenly arranged around the wheel hub (10).

9. A wheel (100) as claimed in claim 1, characterized in that each loop is made of a single material.

10. A vehicle comprising a wheel (100) according to claim 1.

11. The vehicle according to claim 10, wherein the rated maximum speed of said vehicle is 50 km/h, or the rated maximum load capacity of each wheel (100) of said vehicle is 500 kg.

12. The vehicle according to claim 10 wherein said vehicle is a bicycle or a scooter.

* * * * *